United States Patent [19]
Delphin et al.

[11] Patent Number: 4,948,546
[45] Date of Patent: Aug. 14, 1990

[54] PROCESS FOR MANUFACTURE OF POLYMETHYL METHACRYLATE SHEET WITH CONTROLLED COLOR

[75] Inventors: Walter H. Delphin, Germantown; Clyde S. Hutchins, Arlington, both of Tenn.; Robert J. Buchacek, Hockessin, Del.

[73] Assignee: E. I. Du Pont de Nemours and Company, Wilmington, Del.

[21] Appl. No.: 279,013

[22] Filed: Dec. 2, 1988

Related U.S. Application Data

[63] Continuation of Ser. No. 210,258, Jun. 23, 1988, abandoned.

[51] Int. Cl.⁵ ............................................. C08L 33/12
[52] U.S. Cl. ..................................... 264/216; 524/96; 524/282; 524/505
[58] Field of Search ......................... 524/505; 264/216

[56] References Cited

U.S. PATENT DOCUMENTS

| | | | |
|---|---|---|---|
| 4,133,861 | 1/1979 | Kato | 264/216 |
| 4,183,991 | 1/1980 | Smiley | 264/216 |
| 4,656,226 | 4/1987 | Hutchins et al. | 525/93 |
| 4,803,026 | 2/1989 | Ikeda | 264/216 |

*Primary Examiner*—C. Warren Ivy
*Attorney, Agent, or Firm*—Charles J. Shoaf

[57] ABSTRACT

AB dispersants made by group transfer polymerization aid in controlling color shift during casting of MMA polymer sheet containing color pigments and additives, particularly chain transfer agent and sheet release agent.

7 Claims, No Drawings

PROCESS FOR MANUFACTURE OF POLYMETHYL METHACRYLATE SHEET WITH CONTROLLED COLOR

FIELD OF THE INVENTION

This invention relates to a process for casting sheet of PMMA. More particularly, it relates to such a process for controlling color shift in a continuous casting process using an AB block copolymer dispersant made by group transfer polymerization to minimize color shift on casting.

BACKGROUND OF THE INVENTION

Technology for casting methyl methacrylate polymer (PMMA) sheet between belts of stainless steel to obtain smooth surfaces is well known, as represented by U.S. Pat. No. 4,133,861—Kato (1979).

Group transfer polymerization (GTP), as described in several patents including U.S. Pat. Nos. 4,414,372—Farnham, et al. and 4,417,034—Webster, both 1983, and 4,508,880—Webster and 4,524,196—Farnham, et al., both 1985. AB dispersants made by GTP are the subject of U.S. Pat. No.4,656,226—Hutchins, et al. (1987) which suggests use in clear or filled cast acrylic sheet.

In the casting of PMMA sheet, there are phenomena which cause shifting in color, apparently due to competition for attachment sites on the pigment surfaces by additives such as chain transfer agent and sheet release agent. When such additives replace the dispersants from the pigment surfaces, the dispersing effect is diminished because the additives are less efficient as dispersants. With diminished dispersing effect, there is more of a tendency for pigment particles to flocculate, leading to color changes. These effects are aggravated by thermal shock from casting cool syrup on a relatively warm metal belt.

SUMMARY OF THE INVENTION

It has been found that color shift can be diminished in a process of manufacturing pigmented sheet comprised of methyl methacrylate (MMA) polymer by casting cooler syrup of polymer of MMA, and preferably a copolymer thereof with up to 2% methacrylic acid, dissolved in MMA monomer on a warmer substrate, wherein the syrup contains pigments which provide color, and additives selected from the group consisting of
  chain transfer agent,
  sheet release agent,
  thermal stabilizer,
  ultraviolet stabilizer, and
  inhibitor,
and controlling the color of the resulting sheet by using in the syrup 100 to 10,000 parts per million (ppm), and preferably 400 to 2000 ppm, by weight of the syrup of pigment dispersant having an A segment and a B segment bonded together to form a block copolymer, the A segment consisting essentially of polymerized methacrylic monomer units and the B segment consisting essentially of polymerized monomer units selected from the group consisting of acrylic and methacrylic groups, the monomer units of said A segment, when homopolymerized, having a polarity which is higher than the polarity of the monomer units of said B segment when homopolymerized, said A segment being bonded to one or more polar groups selected from the group consisting of
  aromatic carboxylic acid,
  aliphatic carboxylic acids which have at least one functional group which increases the polarity of the reaction product of the A segment with the aliphatic carboxylic acid,
  ammonia and primary, secondary and tertiary aliphatic amines,
  primary aromatic amines, quaternary amine salts,
  epoxides and derivatives thereof which are subsequently hydrolyzed to diols, or reacted with orthophosphoric acid,
  phosphorus pentoxide, and
  anhydrous hydrohalogen acid,
wherein said block copolymer is made by group transfer polymerization techniques at 0° C. or higher.

The dispersant made by GTP is substantially more effective than random acrylic copolymer made by other techniques, perhaps because it more aggressively holds onto the pigment attachment sites in competition with the additives. Suitable dispersants are of the type disclosed and claimed in U.S. Pat. No. 4,656,226 mentioned above, which is hereby incorporated herein by way of reference.

DETAILED DESCRIPTION

Formulations for producing pigmented continuously cast polymethyl methacrylate sheeting are well known. These formulas invariably contain methyl methacrylate monomer (MMA) and polymer, free radical initiators, crosslinking agents, pigments, other acrylate monomers, polymers and copolymers, and varying amounts, usually less than 1%, of additives. The function of the additives is to modify the polymer properties. While their concentrations are usually small, they are essential to the production of a marketable sheet product. Some examples of common additives and their generic names are listed in Table 1.

TABLE 1

| Chemical Name | Abbreviation | Generic Name |
| --- | --- | --- |
| Lauryl mercaptan | LM | Chain transfer agent |
| Sodium dioctyl sulfosuccinate | SDS | Sheet release agent |
| Dilauryl dithiopropionate | DLTDP | Thermal Stabilizer |
| 2(2'hydroxy-5' methyl phenyl benzoxiazole) | HMPB | UV-stabilizer |
| 2,4-dimethyl-6-t-butyl phenol | DBP | Inhibitor |

The pigments which are added to the casting formulations are almost always premixed with a dispersant. Pigments that have been dispersed with dispersants that are commercially available, when added to a typical continuous casting formulation, show a drifting in the color of the cast product. A comparison of the color of laboratory castings and continuous castings on a stainless steel belt polymerizer of these commercial dispersion formulations also exhibit a substantial difference in color.

We have found that the additives in the casting formulation are causing the color changes. The additives which are most active in producing color drifts are the sheet release agent, SDS, and the chain transfer agent, LM. We have also found that when the pigments are dispersed with the GTP dispersant MMA/BMA//-

GMA (Dp-40//Dp-12) +p-nitrobenzoic acid (GTP1) where BMA is n-butyl methacrylate and GMA is glycidyl methacrylate, the colors are substantially less affected by the additives. The MMA/BMA mole ratio is 1:1. Consequently, color drifting in the cast product, made with the GTP dispersant, is substantially reduced, and the difference between the continuous casting and the laboratory casting color is much smaller.

This invention is a formulation for preparing pigmented cast acrylic sheeting in which the pigment colors are substantially unaffected by the additives in the sheeting. Additives for the purposes of this discussion are those chemicals which are added to the formulation other than the acrylate monomers and polymers, initiators, crosslinking agents and pigments.

EXAMPLES

Mill Base Preparations:

Using standard ball mill techniques, mill bases were prepared for each of the following pigments: (1) $TiO_2$, (2) tan iron oxide, (3) red iron oxide, (4) lead chromate, (5) cadmium seleno-sulfide and (6) carbon black. The pigment concentrations in the mill bases were 50% for (1) and (5), 40% for (2), (3) and (4) and 15% for (6). Other mill base components were the dispersant (2–10%), a methyl methacrylate/methacrylic acid copolymer (98% MMA +2% MAA, Tg =101° C.) having a molecular weight (Mw) of about 25,000, and methyl methacrylate (MMA) monomer (remainder). The dispersant loading was optimized to the dispersant demand test, and the polymer content was adjusted to give a viscosity range of 300–600 cP. The MMA was inhibited with 0.003% DBP.

EXAMPLE 1

Three hundred grams of methyl methacrylate/methacrylic acid copolymer (98/2) was dissolved in 700 grams of MMA monomer to produce a syrup with a viscosity of 300 cP. A 6.83 g aliquot of a 50/50 mixture of mill bases 1 and 2, prepared with the dispersant GTP, was then added to a 300 gram portion of the syrup giving about 180 ppm of GTP1. Ninety grams (90 g) of this pigmented syrup were then added to each of three containers which also contained catalyst—5 grams of 4.5% it-butyl peroxyneodecanoate (PND) and 0.9% 2,2,-azobis(2,4-dimethylvaleronitrile) (V64 from Du Pont) in MMA, plus crosslinking agent—5 g of 7% ethylene dimethacrylate (EDMA) in MMA. The following ingredients were also added to each container:
1. Nothing
2. 0.2 g of lauryl mercaptan (LM)
3. 0.1 g of 5% sodium dioctyl sulfosuccinate (SDS).

The total weight in each container was adjusted to 100 g by adjusting the MMA monomer content of the sample. The contents of each container were mixed well, degassed and placed in glass casting cells. The cells (4"×6"×3/16") were immersed in an 80° C. water bath for at least one hour until the polymerizations were complete. The castings were cooled, dried and the color coordinates were measured with a colorimeter. The color coordinates are expressed as CIE Lab L*, a*, b* values. The color differences are expressed as the delta values. The color changes between castings 1 and 2, and 1 and 3 were calculated by subtracting the values of 1 from 2 and 3. These are shown in Table 2. The L*, a*, b* values for casting 1 were 67.23, 16.36, 43.75, respectively.

TABLE 2

| Castings | Color Changes | | |
|---|---|---|---|
| | ΔL* | Δa* | Δb* |
| 2-1 | −0.08 | 0.02 | 0.07 |
| 3-1 | −0.21 | −0.03 | −0.25 |

The values shown above are the color changes produced by the addition of chain transfer additives LM and the addition of sheet release agent SDS, respectively, versus the no additive case. Note the small color changes produced and compare to Example 2.

EXAMPLE 2

An experiment identical to Example 1 was performed with the exception that the GTP dispersant in the mill base was replaced with a 280 ppm of a commercially prepared dispersant (Du Pont's Elvacite AB-1030) which is prepared by random polymerization techniques. The L*, a*, b* values for Casting 1 were 64.95, 17.56, 42.46, respectively. The results are shown in Table 3.

TABLE 3

| Castings | Color Changes | | |
|---|---|---|---|
| | ΔL* | Δa* | Δb* |
| 2-1 | −0.41 | −0.18 | 0.25 |
| 3-1 | 0.91 | −0.33 | 0.1 |

EXAMPLE 3

A mixture of the mill bases 3, 4, 5 and 6, prepared with GTP1, was made. A control laboratory casting, Casting A, was prepared which contained the mill base mixture (2.0 g), initiator (0.225 g of PND and 0.042 g of V64), crosslinking agent (0.35 g. of EDMA) and syrup to total 100 g with about 156 ppm of GTP1. The color coordinates of Casting A were L*, a* and b* equal to 30.45, 38.69 and 41.35, respectively. A second laboratory casting, Casting B, was prepared which contained all of the control's components plus the additives LM (0.200 g), SDS (0.005 g), HMPB (0.020 g) and the monoethyl ether of hydroquinone (0.10 g). A third casting, Casting C, was prepared on the continuous belt polymerizer as described in U.S. Pat. No. 4,133,861. Casting C contained components identical to those in Casting B. The changes in the colors of the three castings are shown in Table 4 as $C_B - C_A$ and $C_{mean} - C_A$. The color of casting C, $C_{mean}$, is the mean value of 10 readings measured with equal spacings perpendicular to the machines direction (total casting width was 100 inches). The Csigma value shown is the standard deviation of the color readings. The L*, a*, b* values for Casting A were 30.45, 38.69, 41.35, respectively.

TABLE 4

| Castings | Color Changes | | |
|---|---|---|---|
| | ΔL* | Δa* | Δb* |
| $C_B - C_A$ | 0.08 | 0.04 | −0.14 |
| $C_{MEAN} - C_A$ | 0.76 | −0.18 | −0.70 |

EXAMPLE 4

An experiment identical to Example 3 with the exception that the mill bases were prepared with a commercially prepared dispersant (Du Pont's Elvacite AB-1030) 244 ppm was performed. The L*, a*, b* values for Casting A were 33.00, 39.17, 44.19, respectively. The results are shown in Table 5.

TABLE 5

| Castings | Color Changes | | |
|---|---|---|---|
| | ΔL* | Δa* | Δb* |
| $C_B - C_A$ | 0.72 | −.23 | 0.71 |
| $C_{MEAN} - C_A$ | −1.68 | −0.91 | −2.80 |

The changes in colors shown in Table 4 and 5 above show the effects of additives on the laboratory castings $C_B-C_A$ and the belt shift between the continuous casting and the laboratory casting $C_{mean}$−CA. A comparison of Tables 4 and 5 shows the effects reduced of additives on casting color and belt shift for the GTP-made dispersant material versus a typical commercial dispersant.

We claim:

1. In the process of manufacturing pigmented sheet comprised of methyl methacrylate (MMA) polymer by casting cooler syrup of polymer comprised of MMA dissolved in MMA monomer on a warmer substrate, wherein the syrup contains pigments which provide color, a pigment dispersant and additives selected from the group consisting of
   chain transfer agent,
   sheet release agent,
   thermal stabilizer,
   ultraviolet stabilizer, and
   inhibitor,
the improvement of controlling the color of the resulting sheet by using in the syrup 100 to 10,000 ppm by weight of the syrup of pigment dispersant having an A segment and a B segment bonded together to form a block copolymer, the A segment consisting essentially of polymerized methacrylic monomer units and the B segment consisting essentially of polymerized monomer units selected from the group consisting of acrylic and methacrylic groups,
   the monomer units of said A segment, when homopolymerized, having a polarity which is higher than the polarity of the monomer units of said B segment when homopolymerized, said A segment being bonded to one or more polar groups selected from the group consisting of
   aromatic carboxylic acid,
   aliphatic carboxylic acids which have at least one functional group which increases the polarity of the reaction product of the A segment with the aliphatic carboxylic acid,
   ammonia and primary, secondary and tertiary aliphatic amines,
   primary aromatic amines, quaternary amine salts,
   epoxides and derivatives thereof which are subsequently hydrolyzed to diols, or reacted with
   orthophosphoric acid,
   phosphorus pentoxide, and
   anhydrous hydrohalogen acid, wherein said block copolymer is made by group transfer polymerization techniques at 0° C. or higher.

2. The process of claim 1 wherein the block copolymer consists essentially of butyl and methyl methacrylate B-segment monomer units and glycidyl methacrylate A-segment monomer units and the polar group bonded to the A-segment monomer units is 4-nitrobenzoic acid.

3. The process of claim 1 wherein the selected additives include
   lauryl mercaptan as chain transfer agent, and
   sodium dioctyl sulfosuccinate as sheet release agent.

4. The process of claim 3 wherein the additives also include one or more of
   dilauryl dithiopropionate as thermal stabilizer,
   2(2' hydroxy-5' methyl phenyl benzoxiazole) as ultraviolet stabilizer, and
   2,4-dimethyl-6-t-butyl phenol as inhibitor.

5. The process of claim 1 wherein the concentration of the dispersant in the syrup is 400 to 2000 ppm.

6. The process of claim 1 wherein the syrup is cast on a moving metal belt.

7. The process of claim 5 wherein the syrup is cast between two moving metal belts.

* * * * *